(12) United States Patent
Hong et al.

(10) Patent No.: US 11,303,185 B2
(45) Date of Patent: Apr. 12, 2022

(54) MOTOR

(71) Applicant: LG Electronics Inc., Seoul (KR)

(72) Inventors: Jin Hong, Seoul (KR); Cheol Han, Seoul (KR); Yongdae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 16/775,472

(22) Filed: Jan. 29, 2020

(65) Prior Publication Data

US 2021/0021171 A1    Jan. 21, 2021

(30) Foreign Application Priority Data

Jul. 16, 2019    (KR) .......................... 10-2019-0085492

(51) Int. Cl.
| | | |
|---|---|---|
| *H02K 5/22* | (2006.01) | |
| *H02K 3/34* | (2006.01) | |
| *H02K 3/52* | (2006.01) | |
| *H02K 3/32* | (2006.01) | |
| *A47L 5/22* | (2006.01) | |

(Continued)

(52) U.S. Cl.
CPC ............. *H02K 5/225* (2013.01); *H02K 3/325* (2013.01); *H02K 3/34* (2013.01); *H02K 3/345* (2013.01); *H02K 3/522* (2013.01); *A47L 5/225* (2013.01); *A47L 5/28* (2013.01); *A47L 9/22* (2013.01); *H02K 2203/06* (2013.01)

(58) Field of Classification Search
CPC .... H02K 3/522; H02K 1/146; H02K 2203/06; H02K 2203/09; H02K 3/34; H02K 3/345; H02K 3/28; H02K 11/33; H02K 5/225; H02K 3/325; A47L 9/22; A47L 5/28; A47L 5/225

USPC .......................................... 310/71, 179, 180
See application file for complete search history.

(56) References Cited

U.S. PATENT DOCUMENTS

2007/0278876 A1*  12/2007  Haga ...................... H02K 3/325
                                                                   310/71
2009/0140595 A1    6/2009  Naganawa et al.
(Continued)

FOREIGN PATENT DOCUMENTS

| CN | 102738970 | 10/2012 |
|---|---|---|
| CN | 104467299 | 7/2017 |

(Continued)

OTHER PUBLICATIONS

Yoon Hur, Parallel Winding Combination Structure using the Busbar of a Brushless Motor for a Car, Jul. 23, 2008, KR 20080068437 (English Machine Translation) (Year: 2008).*

(Continued)

*Primary Examiner* — Quyen P Leung
*Assistant Examiner* — Alexander A Singh
(74) *Attorney, Agent, or Firm* — Fish & Richardson P.C.

(57) ABSTRACT

Various embodiments relate to a motor in which a structure of an insulator is improved. The motor includes an upper insulator coupled to a top face of a stator core. The upper insulator includes a power terminal unit connected to each of 3-phases power lead wires; and an upper insulator body for insulating the power terminal unit from the stator core. The upper insulator includes protrusions radially protruding from the upper insulator body. Each protrusion has a guide hole defined therein for receiving each of the 3-phases power lead wires.

20 Claims, 10 Drawing Sheets

(51) Int. Cl.
*A47L 5/28* (2006.01)
*A47L 9/22* (2006.01)

(56) References Cited

U.S. PATENT DOCUMENTS

| | | | | |
|---|---|---|---|---|
| 2009/0243408 | A1* | 10/2009 | Ueta | H02K 3/522 |
| | | | | 310/71 |
| 2012/0112582 | A1 | 5/2012 | Kim | |
| 2015/0137637 | A1 | 5/2015 | Jang et al. | |
| 2015/0357878 | A1* | 12/2015 | Fukunaga | H02K 3/28 |
| | | | | 310/71 |
| 2017/0005535 | A1* | 1/2017 | Gervais | H02K 3/522 |
| 2017/0104378 | A1* | 4/2017 | Dawson | H02K 15/065 |

FOREIGN PATENT DOCUMENTS

| | | | |
|---|---|---|---|
| CN | 108631473 | 10/2018 | |
| EP | 2722973 A2 * | 4/2014 | ............... H02K 3/28 |
| EP | 3355447 | 8/2018 | |
| JP | 2014138499 | 7/2014 | |
| KR | 1020060112310 | 11/2006 | |
| KR | 20080068437 A * | 7/2008 | |
| KR | 1020150057566 | 5/2015 | |
| TW | 200401491 | 1/2004 | |
| TW | 591848 | 6/2004 | |
| TW | 201521330 | 6/2015 | |
| TW | 201703399 | 1/2017 | |
| TW | I573372 | 3/2017 | |
| WO | WO2012070752 | 5/2012 | |
| WO | WO-2019102641 A1 * | 5/2019 | ............... H02K 5/08 |

OTHER PUBLICATIONS

Yoshida et al, Motor, May 31, 2019, Nidec Corporation, WO 2019102641 (English Machine Translation) (Year: 2019).*
EP Search Report in European Application No. 20150919.7, dated Jul. 15, 2020, 11 pages.
AU Office Action in Australian Appln. No. 2020200614, dated Dec. 22, 2020, 7 pages.
KR Notice of Allowance in Korean Appln. No. 10-2019-0085492, dated Nov. 26, 2020, 1 page (English translation only).
TW Office Action in Taiwanese Appln. No. 109100976, dated Dec. 11, 2020, 7 pages (with English translation).

* cited by examiner

MOTOR

CROSS-REFERENCE TO RELATED APPLICATIONS

This application claims the benefit of Korean Patent Application No. 10-2019-0085492, filed on Jul. 16, 2019, which is hereby incorporated by reference as if fully set forth herein.

BACKGROUND OF THE INVENTION

Field of the Invention

Various embodiments of the present disclosure relate to a motor in which a structure of an insulator is improved.

Discussion of the Related Art

A general motor realizes a driving force via interaction between a stator and a rotor. Basically, structures of the stator and the rotor are the same.

However, types of the motors are divided based on a principle of rotation of the rotor due to the interaction between the stator and the rotor. In addition, the types of the motors may be divided based on a type or a phase of power applied to a stator coil. In addition, the types of the motors may be divided depending on a scheme for winding the stator coil. In an example, a variable voltage motor is of a direct current type, while a 3-phase induction motor is of an alternating current type.

A general structure of the motor includes a rotation shaft, a rotor coupled to the shaft, and a stator fixedly disposed inside a housing. Further, the stator surrounds the rotor and is spaced from the rotor by a predetermined spacing.

In addition, the stator has teeth to wind a coil therearound to generate a rotating magnetic field, thereby inducing electrical interaction between the rotor and the stator to induce rotation of the rotor.

A scheme for winding the coil may include a concentrated winding scheme and a distributed winding scheme. In the concentrated winding scheme, the coil is wound in one slot in a concentrated manner. Further, the distributed winding scheme, the coil is wound in at least two slots in a divided manner.

In the concentrated winding scheme, copper loss may be reduced via reducing a winding amount, compared to the distributed winding scheme. However, the coil is excessively concentrated in the slot, causing a large change in a magnetic flux density and increasing core loss (or iron loss), that is, power loss of the iron core. Thus, the concentrated winding scheme is generally used in a small motor.

Recently, motors used in various home appliances (such as hair dryers, cleaners, and the like) have been developed to overcome spatial restriction and improve an insulation performance due to demands of miniaturization and performance improvement.

In order to improve the performance of the motor, it is necessary to increase the number of windings of the coil in a winding space or increase a diameter of the coil. However, the winding space defined between the teeth of the stator is limited in size. Insulation of the coil is not secured when a size of the stator is reduced to follow a trend of lightening the motor. This may adversely affect the performance of the motor.

In Patent Document 1 (KR 10-2015-0031634, published on Mar. 25, 2015), a structure of an insulator is simplified by arranging terminals with the same shape such that center axes of virtual circles formed by extending an inner circumferential faces thereof are different from each other. Further, Patent Document 2 (KR 10-2017-0052986, published on May 15, 2017) discloses a structure in which a fixing portion protruding from a bus-bar is inserted into a slot portion defined in an insulator to couple the bus-bar and a stator with each other. Further, Patent Document 3 (KR 10-2016-0139824, published on Dec. 7, 2016) discloses a structure in which a structure of a terminal of a bus-bar is improved, so that the terminal is fitted to a top face of a stator in an annular structure. Further, Patent document 4 (KR 10-2016-0030924, published on Mar. 21, 2016) discloses a structure in which input/output terminals of a bus-bar are alternately arranged in a vertical direction on an outer circumference.

However, in the structures of the bus-bar and the insulator applied to the above-mentioned patent documents, a plurality of bus-bars are arranged inwardly of an outer diameter of the motor, and connection of lead wires is achieved while winding the lead wires around the insulator. This requires a lot of space in a radial direction.

In particular, when the terminals are located on the same plane as in the structure of Patent Document 1, utilization of the space is increased, but a lot of space is required in the radial direction as described for securing insulation between the terminals. Further, when the space in the radial direction is reduced, it is difficult to secure the insulation.

Therefore, there is a need for structural improvement allowing achieving miniaturization of the motor and at the same time ensuring the insulation performance.

PRIOR ART DOCUMENT

Patent Document

Patent Document 1: KR 10-2015-0031634 (published on Mar. 25, 2015)
Patent Document 2: KR 10-2017-0052986 (published on May 15, 2017)
Patent Document 3: KR 10-2016-0139824 (published on Dec. 7, 2016)
Patent document 4: KR 10-2016-0030924 (published on Mar. 21, 2016)

SUMMARY OF THE INVENTION

One purpose of the present disclosure is to provide a motor with improved bus-bar and insulator structures by which spatial restrictions caused by miniaturization of the motor may be overcome.

Further, another purpose of the present disclosure is to provide a motor with improved bus-bar and insulator structures by which an insulation distance between a stator core and a lead wire of a coil is secured to improve insulation performance.

Further, another purpose of the present disclosure is to provide a motor in which a gap between each of 3-phases power lead wires and a bus-bar directly connected to an inverter is minimized, thereby minimizing a portion acting as a resistor.

Further, another purpose of the present disclosure is to provide a high-speed 3-phase motor having a teeth-divided core and a concentrated winding to ensure performance improvement and miniaturization.

Further, another purpose of the present disclosure is to provide a motor in which connections of U, V, and W phases lead wires and neutral-point lead wires to terminals may be achieved while overcoming spatial restriction in a stator's outer diameter and a radial direction of a back yoke.

Further, another purpose of the present disclosure is to provide a motor in which a coil may be wound around teeth, and then, each of U, V, and W phases lead wires may be connected to each power terminal without bending the U, V, and W phases lead wires and rather using a structural feature of an insulator.

Further, another purpose of the present disclosure is to provide a motor with an improved insulator structure such that an insulation distance for each of U, V, and W phases lead wires and neutral-point lead wires may be secured while overcoming spatial restriction in a radial direction of a back yoke.

Further, another purpose of the present disclosure is to provide a motor in which connection of a bus-bar and an insulator is realized within a radial region of a stator core for miniaturization of the motor.

Further, another purpose of the present disclosure is to provide a motor in which a teeth-divided core is coupled to a stator core in an axial direction for connection of the lead wires to terminals.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

To achieve the various purpose of the present disclosure, an exemplary embodiment of the present disclosure provides a motor in which a shape of an insulator is not limited based on an outer diameter of a stator and a thickness of the back yoke, and the insulator is disposed in an inner space of the stator in an axial direction of the motor.

An exemplary embodiment of the present disclosure provides a motor in which U, V, and W phases lead wires are directly coupled with an inverter through a connection structure between an insulator and a terminal.

An exemplary embodiment of the present disclosure provides a motor in which connection of the U, V, and W phases lead wires to terminals and connection of the neutral-point lead wires to terminals may be realized in opposite faces of the stator core.

An exemplary embodiment of the present disclosure provides a motor in which insulation performance may be improved by ensuring an insulation distance between a stator core, a bus-bar (U, V, and W phases lead wires), and a neutral-point lead wire connection ring.

In a first aspect, the present disclosure proposes a motor comprising: a stator; and a rotor rotatable with respect to the stator, wherein the stator includes: a stator core defining a back yoke; teeth extending radially from the back yoke; each coil wound around each tooth, wherein the coils are respectively upwardly drawn out of the teeth to define 3-phases power lead wires of the coils; and an upper insulator coupled to a top face of the stator core, wherein the upper insulator includes: a power terminal unit connected to each of the 3-phases power lead wires; and an upper insulator body for insulating the power terminal unit from the stator core, wherein the upper insulator includes protrusions radially protruding by a predetermined length from the upper insulator body, wherein each protrusion has a guide hole defined therein for receiving each of the 3-phases power lead wires of the coils.

In one implementation of the first aspect, an area of a cross section of the guide hole decreases upwardly. In one implementation of the first aspect, the guide hole vertically passes through the protrusion, wherein a circumference dimension of a cross section of the guide hole decreases upwardly.

In one implementation of the first aspect, each power terminal unit includes a power terminal disposed on a top face of the protrusion and connected to each of the 3-phases power lead wires of the coil passing through the guide hole. In one implementation of the first aspect, the power terminal is disposed above and directly contacts the guide hole.

In one implementation of the first aspect, the power terminal unit further includes a connection terminal connected to the power terminal and thus connected to each of the 3-phases power lead wires, wherein the connection terminal is disposed on a top face of the protrusion.

In one implementation of the first aspect, each of the 3-phases power lead wires is drawn out from each tooth toward the guide hole and passes through the hole and then is connected to each power terminal.

In one implementation of the first aspect, the stator further includes a lower insulator coupled to a bottom face of the stator core, wherein the coils are respectively downwardly drawn out of the teeth to define neutral-point lead wires of the coils; and wherein the lower insulator includes: a neutral terminal unit connected to the neutral-point lead wires; and a lower insulator body for insulating each neutral terminal unit from the stator core.

In one implementation of the first aspect, the neutral terminal unit includes: each neutral terminal protruding in a radial direction of the back yoke and connected to each neutral-point lead wire; and a neutral connecting member for connecting the neutral terminals with each other.

In one implementation of the first aspect, the neutral connecting member defines a portion of an inner face of the lower insulator. In one implementation of the first aspect, the neutral terminals have the same vertical level.

In one implementation of the first aspect, each neutral-point lead wire is connected to each neutral terminal inside the lower insulator.

In a second aspect, the present disclosure proposes a motor comprising: a stator; and a rotor rotatable with respect to the stator, wherein the stator includes: a stator core having an inner circumferential face defining a back yoke, and a groove defined along the inner circumferential face; teeth, each tooth including a coupling portion received in the groove and a wound portion extending from the coupling portion radially and inwardly of the back yoke; each coil wound around each tooth, wherein the coils are respectively upwardly drawn out of the teeth to define 3-phases power lead wires of the coils; an upper insulator coupled to a top face of the stator core; and a lower insulator coupled to a bottom face of the stator core, wherein the upper insulator includes: each power terminal unit connected to each of the 3-phases power lead wires; and an upper insulator body for insulating the power terminal unit from the stator core, wherein the coils are respectively downwardly drawn out of the teeth to define neutral-point lead wires of the coils; and wherein the lower insulator includes: a neutral terminal unit connected to the neutral-point lead wires; and a lower insulator body for insulating each neutral terminal unit from the stator core.

In one implementation of the second aspect, each power terminal unit includes a power terminal connected to each of the 3-phases power lead wires and disposed radially and inwardly of the back yoke, wherein the neutral terminal unit includes each neutral terminal connected to each neutral-point lead wire and disposed radially and inwardly of the back yoke.

In one implementation of the second aspect, the upper insulator includes protrusions protruding by a predetermined length from the upper insulator body radially and inwardly thereof, wherein each power terminal contacts each protrusion.

In one implementation of the second aspect, each protrusion has a guide hole passing therethrough for receiving each of the 3-phases power lead wires of the coils, wherein the power terminal is disposed above and directly contacts the guide hole.

In one implementation of the second aspect, the neutral terminal unit includes: each neutral terminal protruding radially and inwardly of the back yoke; and a neutral connecting member for connecting the neutral terminals with each other.

In one implementation of the second aspect, the neutral terminal unit is inserted into the lower insulator body to form the lower insulator.

In one implementation of the second aspect, the neutral terminals have the same vertical level.

In one implementation of the second aspect, the 3-phases power lead wires extend upwardly of the teeth, and wherein the neutral-point lead wires extend downwardly of the teeth.

The features of the above-described embodiments may be implemented in a combined manner in other embodiments as long as they are not inconsistent with other embodiments.

Effects of the present disclosure are as follows but are not limited thereto.

According to the present disclosure, an outer diameter of the stator may be reduced and a radial thickness of the back yoke may be reduced, thereby realizing miniaturization and weight lightening of the motor.

In addition, connection of the 3-phases power (U, V, and W) and neutral-point lead wires to the terminals may be achieved while not being limited based on the radial thickness of the back yoke. A portion that may act as the resistor against the magnetic flux may be minimized due to the connection structure of the 3-phases power (U, V, W) lead wires to the terminals as disclosed in the present disclosure.

In addition, the insulator module is coupled to the stator core in the axial direction. This may minimize the radial thickness of the stator core such that the motor may be miniaturized.

In addition, the insulation distances between the stator core and the bus-bar (U, V, and W phases lead wires) and the neutral-point lead wire connection ring are secured to ensure insulation improvement.

In addition, the power terminal and the neutral terminal are separated from each other in the vertical direction via the stator core. Thus, the insulation strength between the terminals may be secured. Further, insulation strength between each terminal and the stator core may be secured due to the insulator structure as disclosed in the present disclosure.

In addition, in order to speed up and miniaturize the motor, the concentrated winding scheme around the teeth-divided core may be applied. The teeth-divided core may be axially coupled to the stator core to facilitate the lead wire connection to the terminals.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
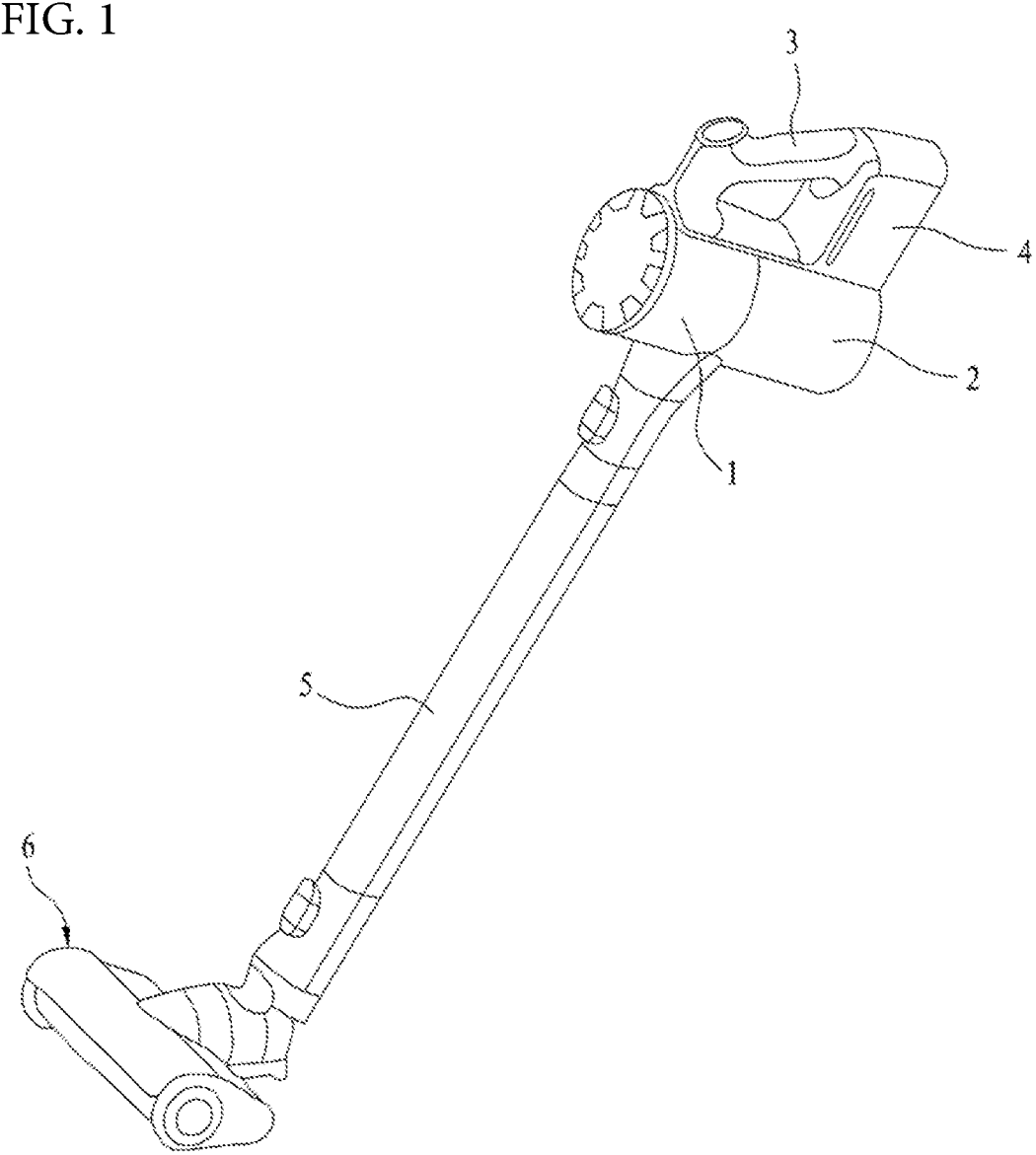
FIG. 1 is a perspective view of a conventional cleaner.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a conventional cleaner.

Referring to FIG. 1, a vacuum cleaner may include a cleaner main body 1 with a motor for generating a suction force, a suction nozzle 6 for sucking air containing dust, and an extension tube 5 for connecting the cleaner main body 1 and the suction nozzle 6 with each other.

Although not shown, the suction nozzle 6 may be directly connected to the cleaner main body 1 without the extension tube 5.

The cleaner main body 1 may include a dust container 2 in which dust separated from air is stored. Accordingly, dust introduced through the suction nozzle 6 may be stored in the dust container 2 through the extension tube 5.

The cleaner main body 1 may be provided with a handle 3 for a user to grip. The user may perform cleaning while gripping the handle 3. The cleaner main body 1 may include a battery (not shown), and the cleaner main body 1 may include a battery accommodating portion 4 in which the battery (not shown) is accommodated. The battery accommodating portion 4 may be provided below the handle 3. The battery (not shown) may be connected to the suction nozzle 6 to supply power to the suction nozzle 6.

Figure 2:
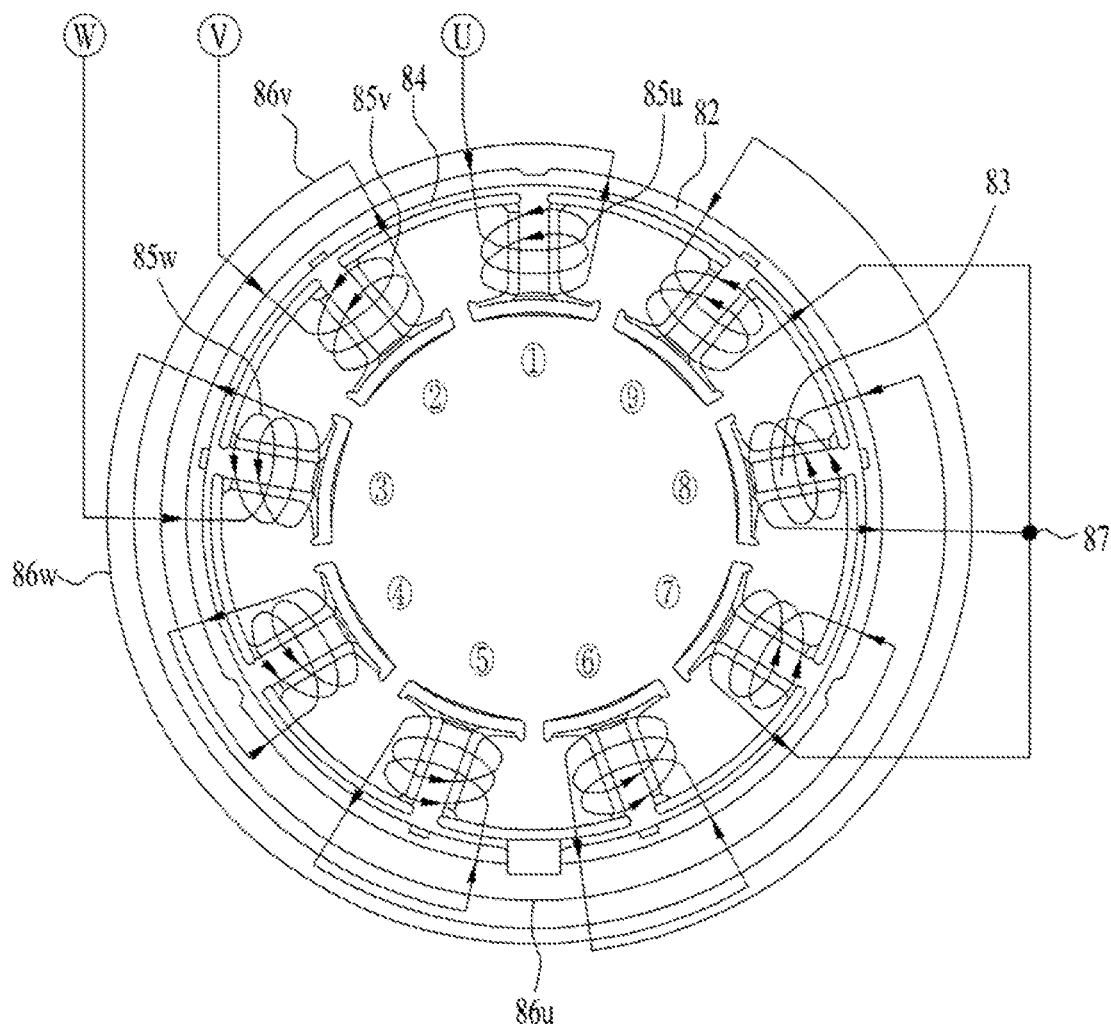
FIG. 2 is a plan view illustrating winding of a conventional coil.

FIG. 2 is a plan view illustrating winding of a conventional coil.

Referring to FIG. 2, a structure of a conventional inner rotor type motor and coil winding thereof will be described. In the conventional inner rotor type motor, teeth 83 extend from a stator core 82 radially inwardly of the stator core 82. The conventional inner rotor type motor may include an insulator 84 for insulating the stator core 82 from the coil.

In the conventional coil winding, a u-phase coil 85u is wound around a 1st tooth 83 clockwise (in a direction of an arrow). The coil does not necessarily have to be wound clockwise. In either case, coils of respective phases have to be wound in the same direction.

When the coil winding around the tooth 83 is finished, the u-phase coil 85u is drawn out of the insulator 84 and then is wound around 4th and 7th teeth sequentially in the same direction as the direction in which the coil is wound around the 1st tooth. Thus, two coil connection wires 86u may be formed outwardly of the insulator 84. Similarly, a v-phase coil 85v is wound around 2nd, 5th, and 8th teeth sequentially in the same manner as the winding manner of the u-phase coil. Thus, two connection wires 86v may be formed. Further, a w-phase coil 85w is wounded around 3rd, 6th, and 9th teeth sequentially. Thus, two connection wires 86w may be formed. The 3-phases power coils are wound around the 9th, 8th, and 7th teeth, respectively, and then are drawn out of the insulator 84 and are joined with each other to form a neutral-point lead wire 87 outwardly of the insulator 84.

The connection wires 86 extend along an outer circumferential face of the insulator. Further, arrangement and insulation of the connection wires 86 are performed by utilizing a radial thickness of a back yoke defining the stator core 82.

That is, in the conventional motor, the arrangement and insulation of the lead wires of the coils are performed using the radial thickness of the back yoke. This causes difficulty in miniaturizing and reducing an overall size of the motor. In addition, although not shown in the drawing, a terminal to connect to each of the 3-phases power lead wires and the neutral-point lead wire should be disposed within the radial thickness of the back yoke to secure an insulation distance.

FIG. 1 and FIG. 2 as described above have described the schematic configurations of the small motor and the inner rotor type motor used in the cleaners. A motor to be described in following embodiments of the present disclosure is also a small motor used in the cleaner or the like. The motor includes an insulator structure allowing securing an insulation performance of the motor while reducing a size and a weight of the motor.

Hereinafter, a motor according to an embodiment of the present disclosure will be described with reference to FIGS. 3 to 10.

Figure 3:
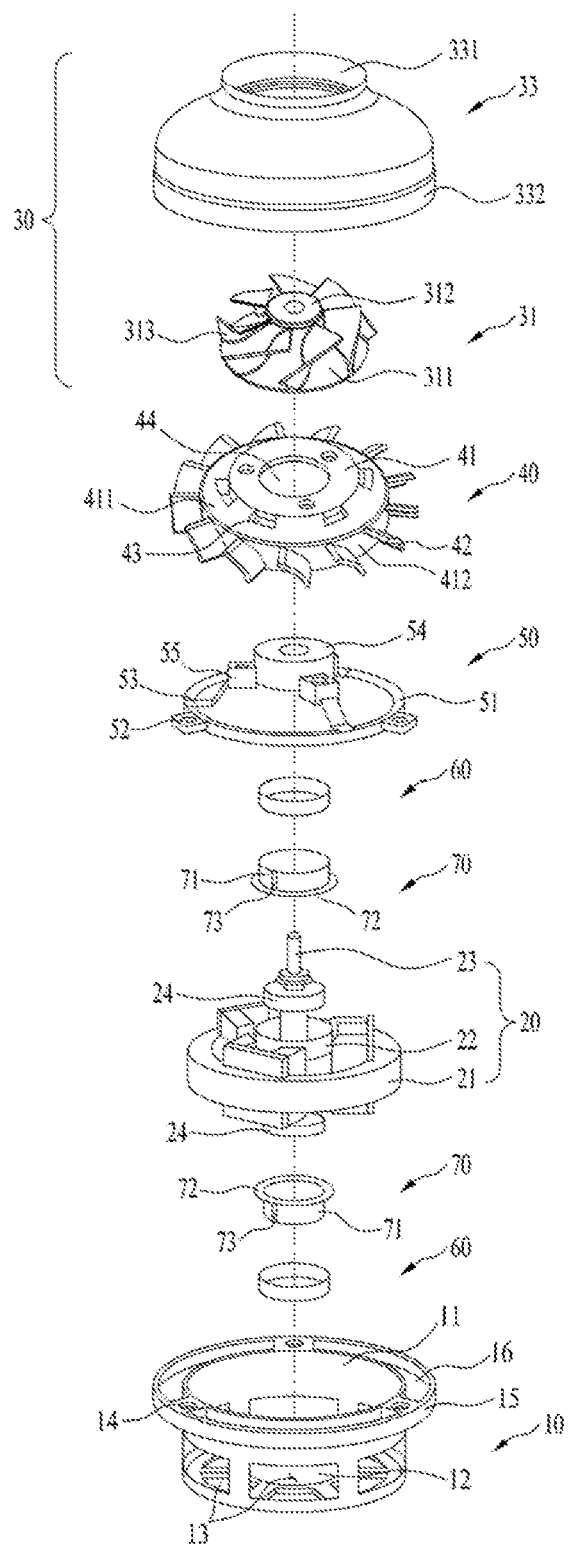
FIG. 3 shows an overall configuration of a motor according to an embodiment of the present disclosure.

FIG. 3 shows an overall configuration of a motor according to an embodiment of the present disclosure.

FIG. 3 shows an overall motor structure of the present embodiment. Connection and insulation structures of the coils and a structure of the insulator will be omitted in FIG. 3. Those omitted in the present drawing will be described in FIGS. 4 to 8 below. It will be understood that the features of FIGS. 4 to 8 are applied to the overall configuration of FIG. 3.

A motor assembly in accordance with the present embodiment includes a motor 20, a housing for receiving the motor 20 therein and defining an overall frame of the motor, a flow generator 30 installed on a top of the housing to generate air flow, and a diffuser 40 for dispersing the air flow generated by the flow generator 30.

The motor 20 includes an annular stator 21, a shaft 23 penetrating a center of the stator 21, and a rotor 22 into which the shaft 23 is mounted. The rotor 22 generates a rotational force via interaction with the stator 21. Further, the shaft 23 is rotatably supported by a bearing 24.

The motor 20 of the present embodiment is illustrated as a brushless direct current motor (BLDC motor). In the present drawing about the BLDC motor, a structure in which the stator 21 is disposed outwardly of the rotor 22 is illustrated. However, the present disclosure is not limited thereto. A motor having a structure in which the stator 21 is disposed inwardly of the rotor 22 is not excluded.

In the drawing, the motor housing 10 is shown below the motor 20 and has a space defined therein for accommodating the motor 20 therein. The motor housing 10 includes a cylindrical motor mounting portion 11 with an open top, a connection arm 14 radially outwardly extending from an upper end of the motor mounting portion 11, and an annular body coupling portion 15 provided at an end of the connection arm 14 and having a diameter larger than that of the motor mounting portion 11. A bottom center portion of the motor mounting portion 11 may include a bearing support 12 for fixing and supporting a bearing 24 at a lower portion of the motor 20.

The bearing 24 may be installed in a form of a bearing assembly in which a bearing holder 70 and an elastic mesh 60 are sequentially wound on an outer circumferential face of the bearing 24.

A bracket 50, the diffuser 40, and the flow generator 30 may be provided above the motor 20, and the flow generator 30 may include an impeller 31 and an impeller cover 33.

The bracket 50 may include a center portion 54 aligned with a hole 45 defined in a central portion of the diffuser and a support 51 formed in an annular shape and having a radius larger than that of the center portion 54. Further, a connecting portion 53 for connecting the center portion 54 and the support 51 with each other may be formed.

In addition, the support 51 may include a fastening portion 52 protruding in a radial direction to be fastened to the motor housing 10, thereby supporting an upper portion of the motor 20.

The diffuser 40 has the hole 45 defined in the center portion thereof.

Further, a plurality of cooling flow path outlets 43 are provided along an outer circumferential face of the hole 45 to define flow paths through which heat generated by the motor 20 discharges.

In one example, a cylindrical portion 412 for forming an outer diameter corresponding to an outer diameter of a side wall of the motor mounting portion 11 along a radial direction of the diffuser 40 is formed and a plurality of vanes 42 are formed along an outer circumferential face of the cylindrical portion 412, thereby guiding flow of air pressurized by the impeller 31.

The impeller 31 is installed above the diffuser 40, and a shaft hole 312 into which the shaft 23 is inserted is provided at a center of the impeller 31. The impeller 31 may be a diagonal flow type impeller in which the shaft hole 312 is defined in a hub 311 that supports the impeller 31 for securing an overall rigidity thereof, the hub 311 has a face inclined downward in a radial direction from a center of rotation, and a radial blade 313 is included.

The impeller cover 33 includes an air inlet 331 defined in an upper center portion thereof, which is a passage through which air moves, and is provided in a form inclined downward with respect to the air inlet 331. A cover coupling portion 332 is provided at a lower end of the impeller cover 33. The cover coupling portion 332 may be provided in a step shape, and the body coupling portion 15 may be fitted into the step-shaped cover coupling portion 332.

Hereinafter, motors according to various embodiments of the present disclosure will be described with reference to FIGS. 4 to 8.

Figure 4:
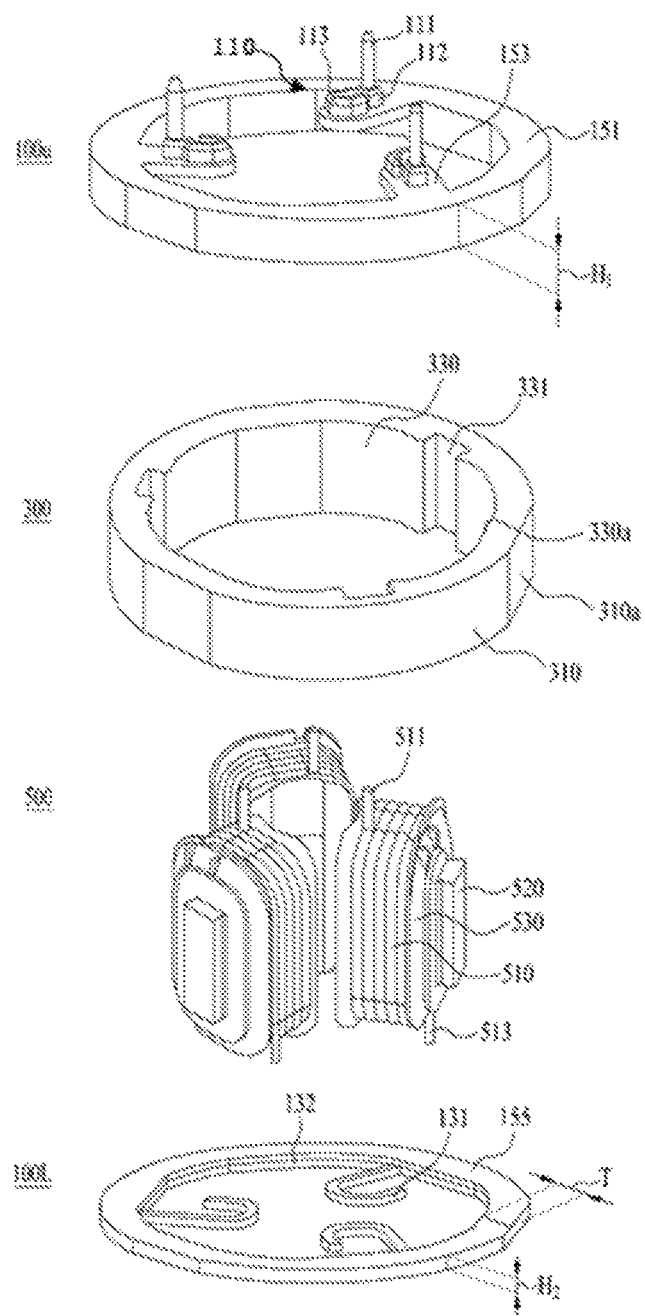
FIG. 4 is an exploded perspective view of a motor according to one embodiment of the present disclosure.

Referring to FIG. 4, a motor of the present embodiment includes a stator and a rotor configured to rotate with respect to the stator. The stator may include a stator core 300 defining a back yoke, teeth 520 extending in a radial direction from the back yoke, a coil 510, an insulator module 100 coupled to upper and lower portions of the stator core 300, and a divided-core 500 inserted into the stator core 300 in an axial direction.

The teeth 520 extend radially inwardly (inner type) of the back yoke in the present embodiment. However, the present disclosure is not necessarily limited thereto. The teeth 520 may extend radially outwardly (outer type) of the back yoke.

In addition, in the present embodiment, a configuration is described in which a concentrated winding scheme around the teeth 520 is applied and a teeth-divided core is inserted into the stator core 300 in an axial direction (longitudinal direction) thereof. This configuration is employed because space constraint occurs due to a small size of the stator core 300 caused by the miniaturization of the motor and, thus, it is difficult to couple the teeth-divided core with the back yoke of the stator in a radial direction of the motor.

The insulator module 100 may include an upper insulator 100U coupled to a top face of the stator core 300 and a lower insulator 100L coupled to a bottom face of the stator core 300. The upper insulator 100U may include a power terminal unit 110 connected to each of 3-phases power wires constituting the coil 510 and an upper insulator body 151 for insulating the power terminal unit 110 from the stator core 300.

The upper insulator body 151 may include a protrusion 153 protruding by a predetermined length in a radial direction and having a guide hole 1531 defined therein for receiving each of the 3-phases power lead wires 511 from the coil 510.

The upper insulator 100U may be coupled to a top face of the stator core 300. The insulator 100U includes the power terminal unit 110 to be connected with each of the 3-phases power lead wires 511 as the coils outgoing from the divided-core 500. Further, the upper insulator body 151 may have a first height H1 for insulation between the 3-phases power lead wires 511, the power terminal unit 110, and the stator core 300.

The power terminal unit 110 may be disposed at a vertical level above the first height H1 to secure an insulation distance corresponding to the first height H1. In the present embodiment, the power terminal unit 110 is located on a top face of the upper insulator body 151.

However, the present disclosure is not necessarily limited to the above-described embodiment. The power terminal unit 110 may be located on an inner face of the upper insulator body 151 and within the first height H1. In this case, the upper insulator 100U may be formed via insert injection molding of the upper insulator body 151 and the power terminal unit 110.

That is, the first height H1 means a vertical dimension from a bottom end to a top end of the upper insulator body 151. When the power terminal unit 110 is located on a top face of the upper insulator body 151 as in the present embodiment, a vertical level of the power terminal unit 110 is not contained in the first height H1. However, when the power terminal unit 110 is located on an inner face of the upper insulator body 151, vertical levels of a power terminal 113 and a power connecting member 112 of the power terminal unit 110 may be present within the first height H1. Even when the power terminal unit 110 is located on the inner face of the upper insulator body 151, a vertical level of a connection terminal 111 is not contained in the first height H1.

In addition, when the power terminal unit 110 is located on the top face of the upper insulator body 151 as in the present embodiment, the power terminal unit 110 may be fixed to the upper insulator body 151 in various manners.

In one example, a groove is defined on a top face of the upper insulator body 151 while a protrusion is formed on a bottom face of the power terminal unit 110. The protrusion may be press-fitted into the groove. Alternatively, the upper insulator body 151 and the power terminal unit 110 may be fixed with each other via an adhesive therebetween.

The upper insulator body 151 may be formed in a hollow cylindrical shape corresponding to a shape of the stator core 300, and may have a predetermined thickness T corresponding to a thickness T of the back yoke. Preferably, the predetermined thickness T in the present embodiment may mean a horizontal dimension from an inner circumferential face 330 to an outer circumferential face 310 of the stator core 300. Further, a thickness of each of the insulator bodies coupled to the top and bottom faces of the stator core 300 may be the same as a radial thickness of the stator core.

The stator core 300 may be formed in a hollow cylindrical shape and have a space defined therein into which the divided-core 500 is inserted. Each of the inner circumferential face 330 and the outer circumferential face 310 of the stator core 300 may be partially flattened.

That is, planar faces 310*a* and 330*a* may be formed on the inner circumferential face 330 and the outer circumferential face 310 of the stator core 300, respectively.

Due to the planar faces 310*a* and 330*a*, the radial thickness of the stator core 300 may be reduced to reduce the overall size of the motor. Further, due to the planar faces 310*a* and 330*a*, a portion that may act as a resisting portion against magnetic flux flowing through the stator core 300 may be reduced to improve the performance of the motor.

In one example, a shape of each body of the insulator module 100 may be a hollow cylindrical shape, which corresponds to the shape of the stator core 300. Planar faces 151*a* may be formed at portions of the outer and inner circumferential faces of the insulator body 151 that are in contact with the planar faces 310*a* and 330*a* respectively.

In addition, at least one groove 331 may be defined in a portion of the inner circumferential face 330 of the stator core 300 along a circumference of the inner circumferential face 330. A tooth 520 of the divided-core 500 may be engaged with the groove 331 in the axial direction (the longitudinal direction of the stator core).

In one example, the upper insulator body 151 may include the protrusion 153. The protrusion 153 may protrude radially and inwardly of the insulator body in the present embodiment.

The upper insulator body 151 is formed in the hollow cylindrical shape. Thus, the radially and inward direction refers to a direction radially and inwardly of an arc of the inner face of the upper insulator body 151. As used herein, the radially and inward direction may mean a direction radially and inwardly of the back yoke.

The protrusion 153 may extend radially and inwardly of the upper insulator body 151. Alternatively, one end of the protrusion 153 and an inner face of the upper insulator body 151 may have a projection and groove respectively. When the projection is received in the groove, the protrusion 153 may be coupled, in an axial direction or in a radial direction, to the upper insulator body 151.

In addition, the protrusions 153 may be spacedly arranged at a 120 degrees angular spacing on the upper insulator body 151. Each guide hole 1531 for receiving each of the 3-phases power lead wires 511 may be defined in each protrusion 153. The guide hole 1531 will be described below.

In one example, the lower insulator 100L is coupled to the bottom face of the stator core 300. The lower insulator 100L may include a neutral terminal unit 130 connected to the neutral power wire of the coil 510 and a lower insulator body 155 for insulating the neutral terminal unit 130 from the stator core 300.

The neutral terminal unit 130 may include neutral terminals 131 protruding radially and inwardly of the back yoke to be connected to the neutral-point lead wire of the coil 510 and a neutral connecting member 132 for connecting the neutral terminals 131 with each other.

The neutral terminals 131 may protrude radially and inwardly of the back yoke and may be disposed inwardly of the lower insulator body, and may be electrically and physically coupled with each other via the neutral connecting member 132.

The neutral connecting member 132 may be bent in a corresponding shape to the shape of the lower insulator body 155 and thus form an inner portion of the lower insulator 100L.

Figure 5A:
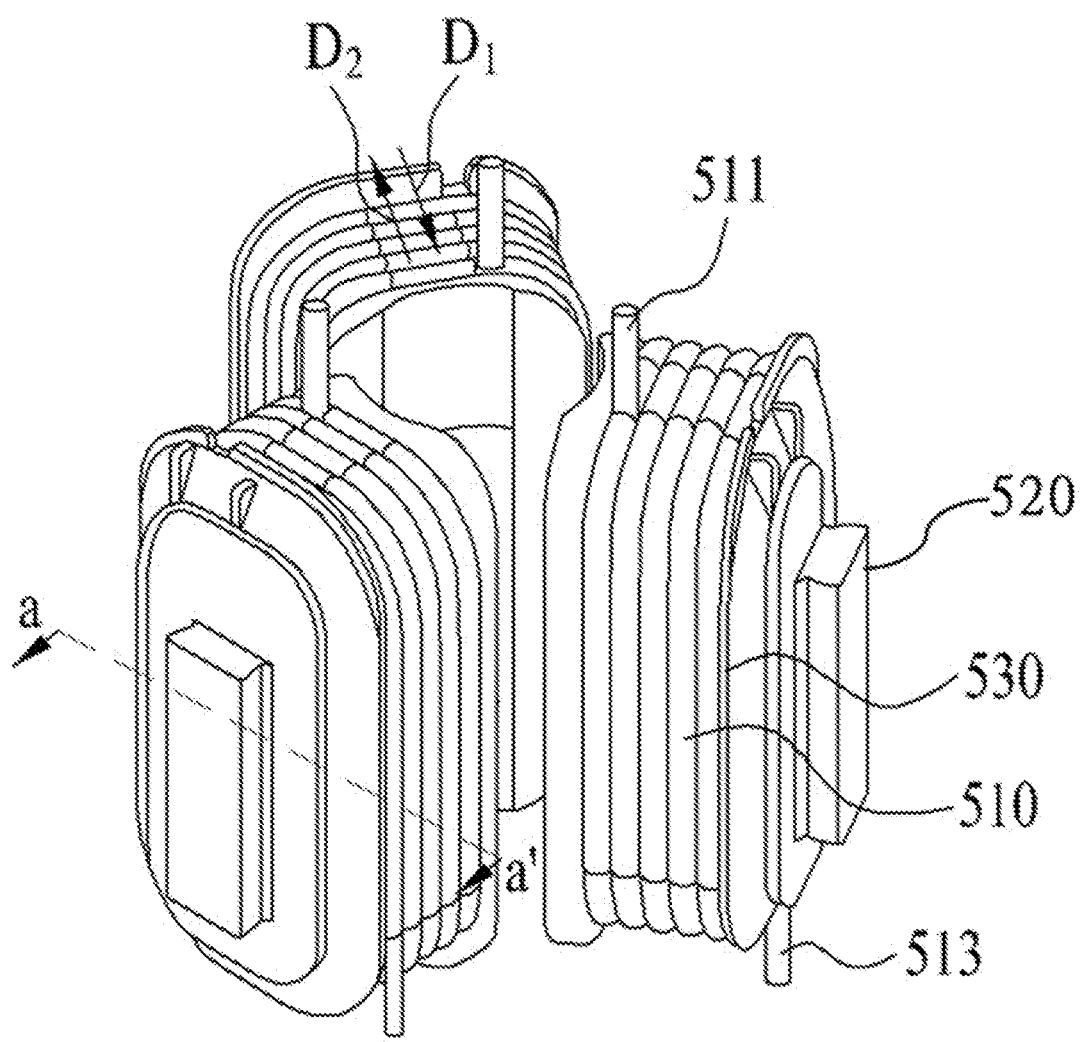
FIG. 5A is a perspective view of a divided-core of FIG. 4.
Figure 5B:
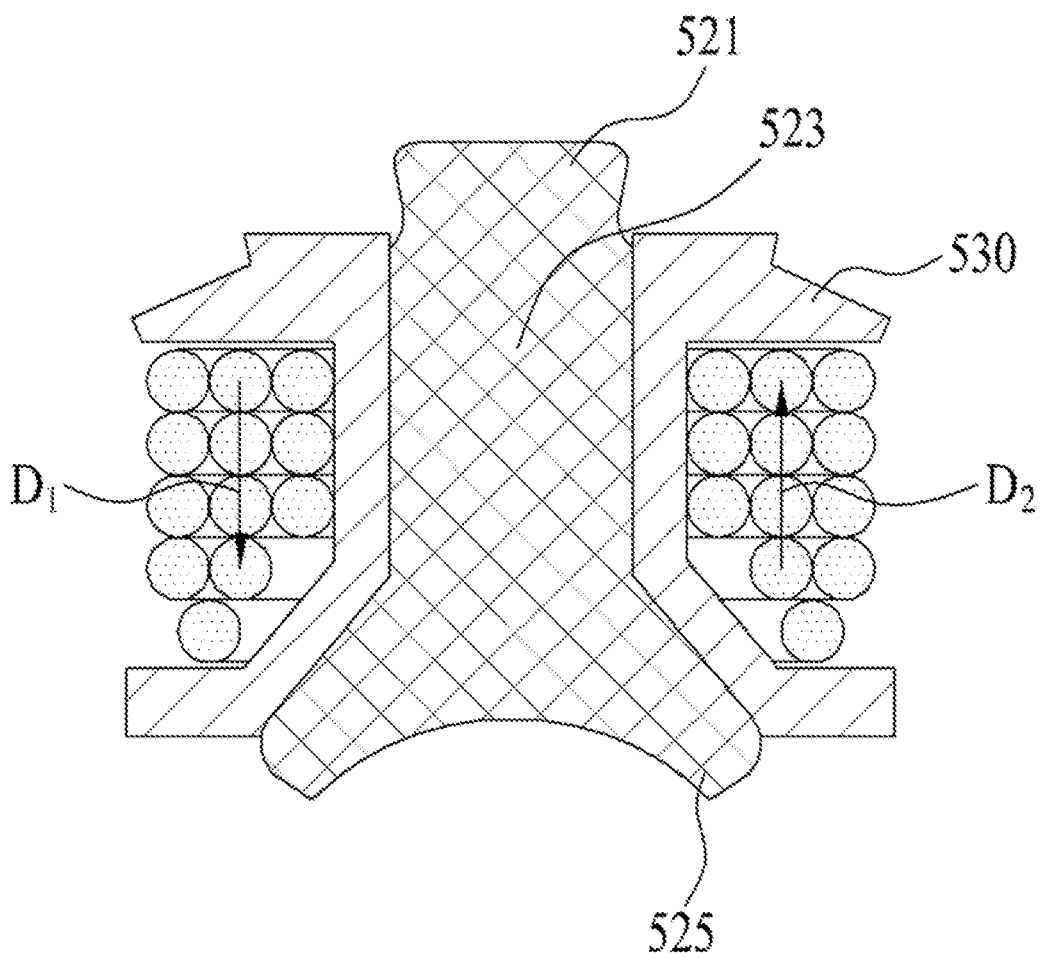
FIG. 5B is a cross-sectional view taken along a line of a-a' of FIG. 5A.

FIG. 5A is a perspective view of a divided-core of FIG. 4, and FIG. 5B is a cross-sectional view taken along a line of a-a' of FIG. 5A.

Referring to FIGS. 5A and 5B, the divided-core 500 of the present embodiment is a teeth-divided core. Further, the divided-core 500 may be inserted into the stator core 300 along an axial direction perpendicular to the radial direction of the stator core 300.

The core 500 may include an insulator 530 surrounding the tooth 520 and insulating the coil 510 from the tooth 520. The insulator 530 surrounds outer faces of a wound portion 523 and a pole shoe 525 of the tooth 520 and defines a section in which the coil 510 is wound.

As described above, the coil 510 may be wound around the tooth 520 in a concentrated winding manner. Further, the 3-phases power lead wires 511 may be drawn upwardly of the divided-core 500. Further, the neutral-point lead wires 513 may be drawn downwardly of the divided-core 500.

The motor of the present embodiment has a structure in which the divided-core 500 is inserted into the stator core 300 along the axial direction from a position below the stator core 300, and the upper insulator 100U is brought into contact with the top face of the stator core 300 in the axial direction, and the lower insulator 100L is brought into contact with the bottom face of the stator core 300 along the axial direction. Thus, the 3-phases power lead wires 511 should be connected to the terminals on a top face of the upper insulator 100U, while the neutral-point lead wires 513 should be connected to the terminals of the lower insulator 100L. Therefore, the lead wires from the coil 510 may be preferably drawn out in different directions, that is, upwardly and downwardly of the divided-core 500.

Further, the lead wires may be respectively connected to the terminals on the insulator module 100 within the radial distance of the back yoke.

In one example, when the coil 510 is wound in a first direction D1, the coil 510 is wound radially and inwardly of the tooth 520. The winding may begin in a clockwise or counterclockwise direction, downwardly of the tooth 520. Then, the coil 520 may be wound upwardly of the tooth 520 and then connected to the terminal.

When the coil 510 is wound in a second direction D2, the coil 510 is wound radially and outwardly of the tooth 520. The winding may begin in a clockwise or counterclockwise direction, downwardly of the tooth 520. Then, the coil 520 may be wound upwardly of the tooth 520 and then connected to the terminal.

A top portion of the tooth 520 may mean a portion close to the upper insulator 100U, and a bottom portion of the tooth 520 may mean an opposite portion to the top portion.

As a result, even when the coil 510 is wound in one of the first direction D1 and the second direction D2, the 3-phases power lead wires 511 may be drawn upwardly of the teeth 520 in the radial region of the back yoke while the neutral-point lead wires 513 may be drawn downwardly of the teeth 520 in the radial region of the back yoke.

In addition, each of the 3-phases power lead wires 511 may be preferably drawn out from a position located close to the pole shoe 525. Thus, each of the 3-phases power lead wires 511 may be easily connected to the power terminal 113 by directly inserting each of the 3-phases power lead wires 511 into the guide hole without bending each of the 3-phases power lead wires 511 because the power terminal 113 is disposed on a top face of the protrusion 153 of the upper insulator 100U.

The neutral terminal 131 may be disposed on an inner face of the lower insulator body 155, so that the neutral-point lead wires 513 may be connected to the terminals in the radial region of the back yoke, that is, in the radial region of the stator core 300.

In one example, the tooth 520 may include a coupling portion 521 coupled to the groove 331 of the stator core 300, the wound portion 523 extending from the coupling portion 521 in the radial direction of the back yoke, and the pole shoe 525 branching from the wound portion 523 and constituting a magnetic circuit.

The pole shoe 525 branches from the wound portion 523 and has a curved inner face along a virtual circumferential face inside the stator core 300. Further, each of the neutral-point lead wires 513 may be connected to the terminal at a position between the inner circumferential face 330 of the stator core 300 and the virtual circumferential surface to ensure an insulation performance.

Figure 6A:
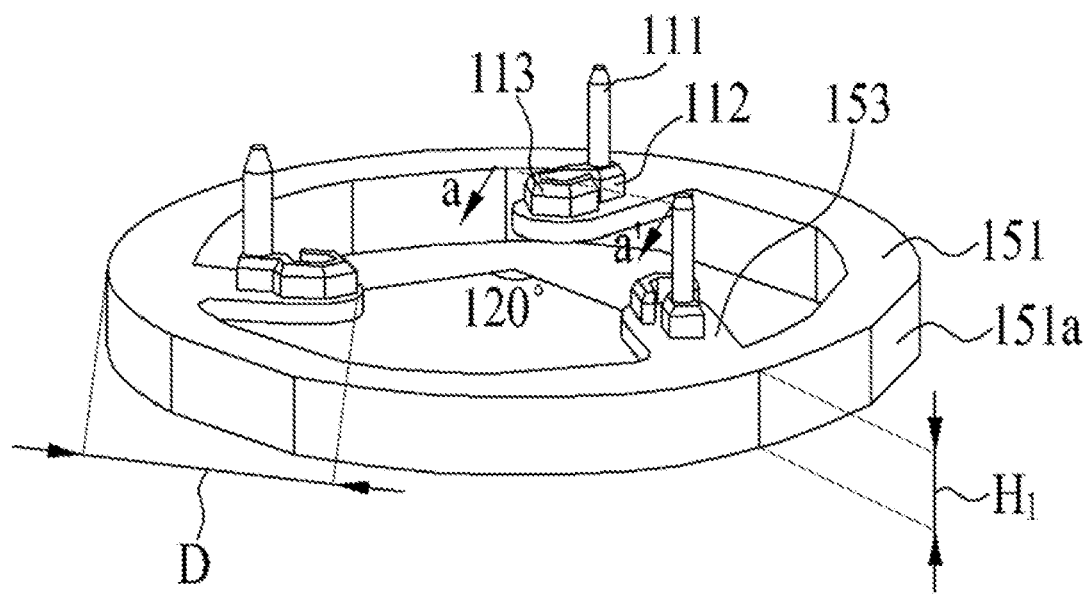
FIG. 6A is a perspective view of an upper insulator of FIG. 4.
Figure 6B:
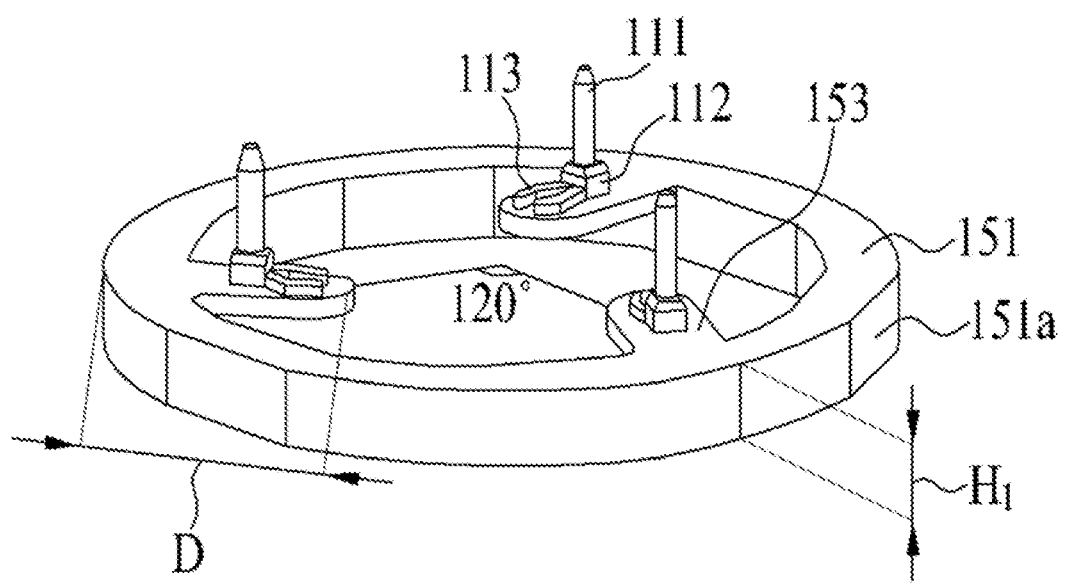
FIG. 6B is a perspective view of an upper insulator according to another embodiment of the present disclosure.
Figure 7:
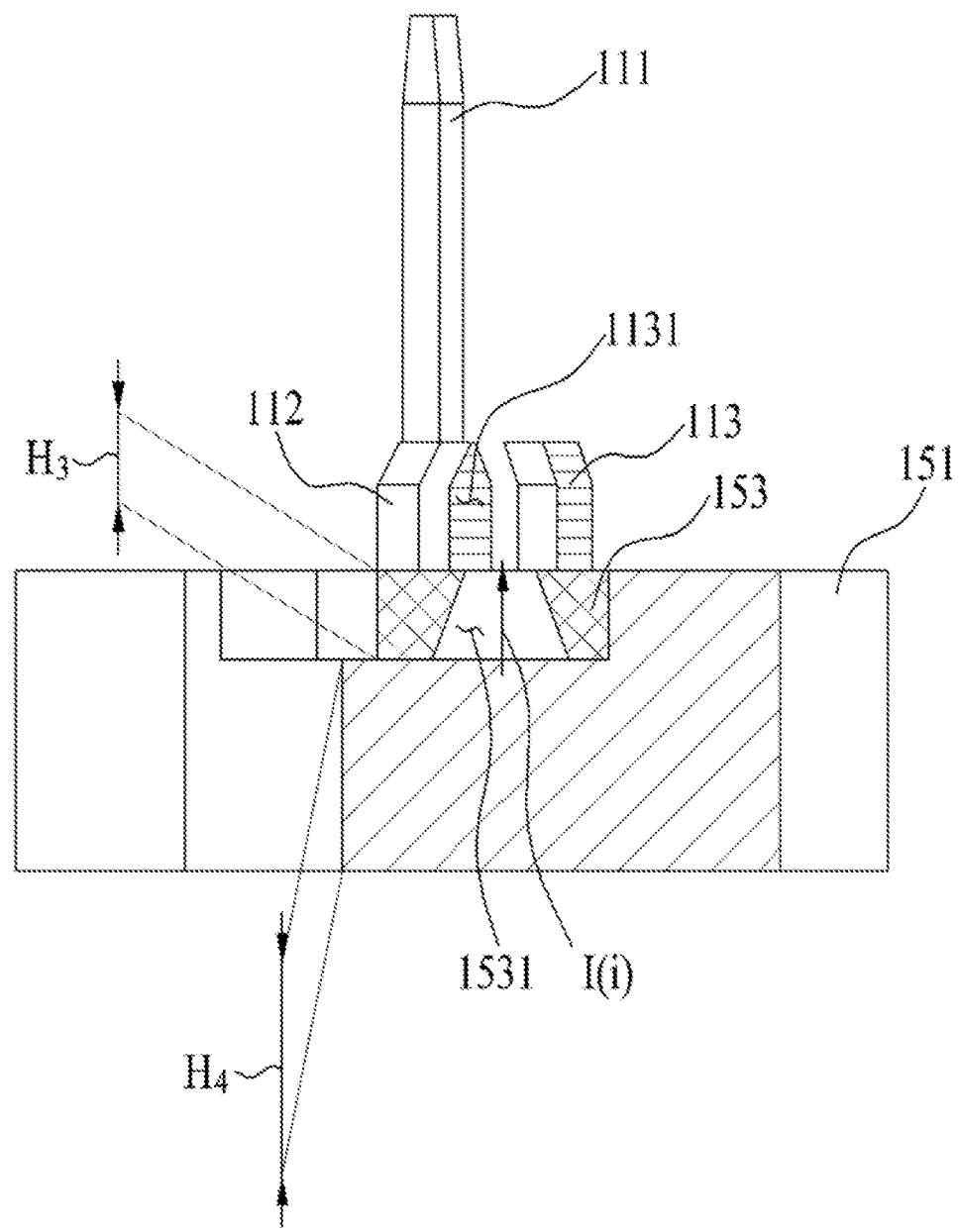
FIG. 7 is a cross-sectional view of FIG. 6A.

FIG. 6A is a perspective view of an upper insulator of FIG. 4. Further, FIG. 6B is a perspective view of an upper insulator according to another embodiment of the present disclosure. Further, FIG. 7 is a cross-sectional view of FIG. 6A.

Referring to FIGS. 6A and 6B, as described above, the upper insulator 100U may include the upper insulator body 151 and each power terminal unit 110. Each planar face 151a may be formed on the outer circumferential face thereof. The body 151 may be formed in the hollow cylindrical shape.

The upper insulator body may have the first height H1 from the lower end to the upper end. Further, each protrusion 153 may extend radially and inwardly of the upper insulator body 151. Preferably, the protrusions 153 may be arranged to be spaced from each other at a 120 degrees angular spacing. Each protrusion 153 may extend by a predetermined distance D from the outer circumferential face of the upper insulator body 151.

The protrusion 153 may have a third height H3. Further, a height from the lower end of the protrusion 153 to a lower end of the upper insulator body 151 may be a fourth height H4. Preferably, a sum of the third height H3 and the fourth height H4 may correspond to the first height H1 as the height of the upper insulator body 151. Thus, the upper insulator 100U may secure an insulation distance for the power terminal unit 110. Otherwise, the insulation performance may decrease when the sum of the third height H3 and the fourth height H4 is smaller than the first height H1.

The protrusion 153 may extend by the predetermined distance D from the outer circumferential face of the upper insulator 100U. The predetermined distance D may correspond to a distance from the outer circumferential face of the stator core 300 to a position to which the pole shoe 525 extends from the wound portion 523. In detail, each of the 3-phases power lead wires 511 may be drawn out from a position close to the pole shoe 525. Therefore, the predetermined distance D may mean a distance from the stator core 300 to the position from which each of the 3-phases power lead wires 511 is drawn out.

Accordingly, each of the 3-phases power lead wires 511 may be directly drawn out upwardly of the tooth 520 and directly connected to the power terminal 113 without being bent.

The power terminal 113 has a space 1131 defined therein for accommodating each of the 3-phases power lead wires 511 therein. The space 1131 may mean a space defined inside the power terminal 113 of a hook shape as shown in FIG. 6A. Alternatively, the space 1131 may mean a space defined inside the power terminal 113 of a fork shape as shown in FIG. 6B. The lead wire 511 located in the space 1131 may be connected to the hook-shaped or fork-shaped power terminal 113 in various ways.

For example, the power terminal 113 may be compressed to remove the space 1131, or the lead wire 511 may be bent and then connected to the power terminal 113.

That is, FIGS. 6A and 6B represent the power terminals 113 having various shapes. The power terminal of FIG. 6A may be formed in the hook shape while the power terminal of FIG. 6B may be formed in the fork shape. Each of the 3-phases power lead wires 511 may be located in the space 1131 of the power terminal 113 and then the power terminal 113 may be compressed, thereby to establish electrical and physical connection between each of the 3-phases power lead wires 511 and the power terminal 113.

In one example, the power terminal unit 110 may include each power terminal 113 connected to each of the 3-phases power lead wires, the connection terminal 111 connected to each of the 3-phases power lead wires, and the power connecting member 112 for physically and electrically connecting the connection terminal 111 with the power terminal 113. Although not shown in the drawing, the connection terminal 111 is connected to a printed circuit board (PCB).

The power terminal unit 110 may be formed such that the power terminal 113 and the power connecting member 112 are injection-molded together and the connection terminal 111 is fixed to the power connecting member 112. In this case, a hole may be defined in the power connecting member 112. Further, the connection terminal 111 may be press-fitted into the hole after forming a predetermined clearance. Alternatively, the connection terminal 111 may be welded and fixed to the power connecting member 112.

That is, for ease of production of the power terminal unit 110, as the power terminal 113 is formed, a margin portion to which the connection terminal 111 is fixed may be formed. The margin portion may correspond to the power connecting member 112 in the present embodiment.

However, the method for manufacturing the power terminal unit 110 is not limited to the method as described above. Further, it will be understood that the method for producing the power terminal unit 110 includes various producing methods for implementing the power terminal unit 110 represented in the present embodiment.

In one example, referring to FIG. 7, the guide hole 1531 may be defined in the protrusion 153. Further, the guide hole 1531 may pass through the protrusion 153 from the lower end to the upper end thereof. Further, the power terminal 113 may be disposed above the guide hole 1531.

A cross section of the guide hole 1531 may be defined such that a width of the cross section decreases along a direction i in which each of the 3-phases power lead wires 511 is inserted therein. Alternatively, the guide hole 1531 may be formed in a shape of a hole penetrating the protrusion 153, and a diameter of the cross section of the hole may decrease along the direction in which each of the 3-phases power lead wires 511 is inserted therein, Since the power terminal 113 is disposed above the guide hole 1531, the shape of the guide hole 1531 may have various shapes such that each of the 3-phases power lead wires 511 is guided by the hole and then connected to the power terminal 113. Further, the various shapes may include not only the above shapes but also a hole shape having a hollow portion corresponding to a diameter of each of the 3-phases power lead wires 511.

In one example, in order for facilitating the guide of each of the 3-phases power lead wires 511, the power terminal 113 may be formed directly above the guide hole 1531. Further, the power connecting member 112 and the connection terminal 111 may be positioned on the protrusion 153 at positions non-overlapping the insertion direction i of each of the 3-phases power lead wires 511. That is, the space 1131 of the power terminal 113 may be in direct communication with the guide hole 1531, and a bottom face of the space 1131 may define a top face of the guide hole 1531.

Figure 8:
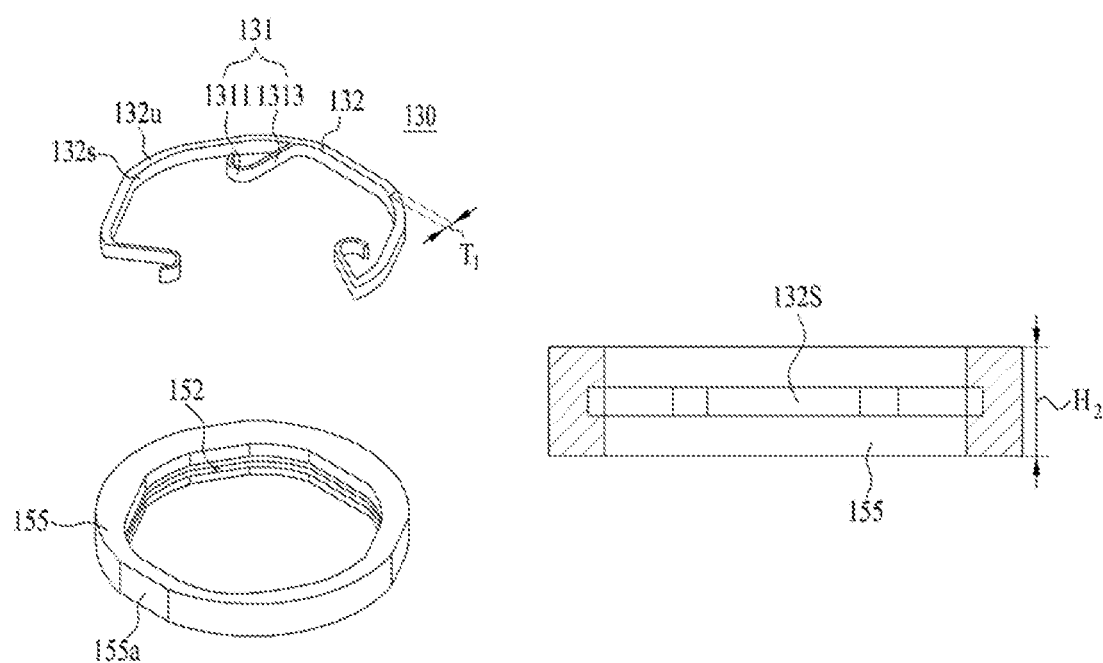
FIG. 8 is an exploded view and cross-sectional view of the lower insulator of FIG. 4.

FIG. 8 is an exploded view and cross-sectional view of the lower insulator of FIG. 4.

Referring to FIG. 8, the lower insulator 100L of the present embodiment may be coupled to the bottom face of the stator core 300, have a second height H2 for securing the insulation distance from the stator core 300, and have a predetermined thickness T in the radial direction.

In addition, the lower insulator 100L may be formed in a hollow cylindrical shape corresponding to the shape of the stator core 300. Like the upper insulator 100U, a planar face 155a may be formed on an outer circumferential face of the lower insulator 100L.

Each neutral terminal 131 may be formed in a hook shape, and may include an extension 1311 protruding inwardly of the lower insulator 100L from the neutral connecting member 132 and a hook 1313 bent from one end of the extension 1311 toward an inner circumferential face of the lower insulator body 155.

However, the shape of the neutral terminal 131 is not limited to a structure only including the extension 1311 and the hook 1313. Various shapes thereof configured such that the neutral terminal 131 is formed inside the lower insulator body 155 and is connected to each neutral-point lead wire 513 may be included herein.

A top face 132u of the neutral connecting member may have a first thickness T1, and the first thickness T1 is smaller than the thickness T of the lower insulator body. Therefore, the neutral connecting member 132 may be received in a receiving groove 152 defined in an inner face of the lower insulator body 155.

The receiving groove 152 may have a thickness corresponding to the first thickness T1 and a depth smaller than the height H2 of the lower insulator body 155, so that the neutral connecting member 132 may be surrounded with the lower insulator body 155.

In the present embodiment, an inner side face 132s of the neutral connecting member 131 defines a portion of the inner face of the lower insulator 100L. However, the present disclosure is not necessarily limited thereto. The side face 132s may be surrounded with the lower insulator body 155.

Therefore, the lower insulator 100L may be formed as a combination of the neutral terminal unit 130 and the lower insulator body 155. The lower insulator body 155 defines a lowermost layer and an uppermost layer of the lower insulator 100L. The neutral terminal unit 130 may define an intermediate layer of the lower insulator 100L. In one example, since the receiving groove 152 in which the neutral terminal unit 130 is seated is defined in the intermediate layer, a remaining portion except for the neutral terminal unit 130 in the intermediate layer may be defined by the lower insulator body 155.

The lower insulator 100L may be produced in an insert injection molding manner, or may be produced by stacking components respectively forming layers of the lower insulator 100L.

Further, regarding a connection configuration between the insulator module 100, the stator core 300, and the divided-core 500, each of the 3-phases power lead wires 511 from the coil 510 may be drawn out upwardly of the tooth 520 in the axial direction and then may be connected to the power terminal 113.

Each of the neutral-point lead wires 513 from the coil 510 is drawn out downwardly of the tooth 520 and bent and then may be connected to the neutral terminal 131. The neutral terminal 131 may include the extension 1313 extending radially and inwardly of the back yoke from the neutral connecting member 132 and the hook 1311 bent from the extension 1313. The extension 1313 may extend radially and inwardly of the back yoke from a location where the insulation distance from the coil 510 is secured. The hook 1311 is preferably bent in a region corresponding to an adjacent tooth of the divided teeth. Accordingly, each of the neutral-point lead wires 513 may be connected to the hook 1311 to secure the insulation distance from the coil 510 located inside the stator core 300.

As a result, each of the 3-phases power lead wires 511 may be connected to each terminal within a radial region of the back yoke. In detail, as the protrusion 153 extends radially and inwardly of the upper insulator body 151, each power terminal 113 located on a top face of the protrusion 153 and each of the 3-phases power lead wires 511 may be connected with each other within the radial region of the back yoke.

Further, each of the neutral-point lead wires 513 may also be connected with each terminal within the radial region of the back yoke. In detail, since the lower insulator 100L has the second height H2 and is present below the stator core 300 and is formed in the shape corresponding to the cylindrical shape of the stator core 300, each of the neutral-point lead wires 513 may be connected with each terminal inside the lower insulator 100L, that is, may be connected to each neutral terminals 131 present in the second height H2.

That is, the connection points between the both lead wires 511 and 513 and the terminals may be present within the radial region of the back yoke. Thus, the insulation performance may be ensured. Further, at the same time, the structural feature of the insulator module 100 may improve the insulation performance. Therefore, an outer diameter of the stator may be reduced and thus a radial thickness of the back yoke may be reduced, so that miniaturization and lightening of the motor may be implemented, and at the same time, the insulation performance may be secured.

Although the present disclosure has been described with reference to the preferred embodiments of the present disclosure, those skilled in the art may understand that the present disclosure may be variously modified and changed without departing from the spirit and scope of the present disclosure as described in the claims below.

What is claimed is:

1. A motor comprising:
   a stator; and
   a rotor configured to rotate relative to the stator,
   wherein the stator comprises:
     a stator core that defines a back yoke of the motor,
     teeth that extend radially inward from an inner circumferential surface of the stator core,
     coils, each of the coils being wound around one of the teeth, wherein a first end of each of the coils is upwardly drawn out of the one of the teeth and configured to provide power to the stator, and
     an upper insulator disposed at an upper side of the stator core, wherein the upper insulator comprises:
power terminal units including a power terminal connected to one of the first ends of the coils,
an upper insulator body that is coupled to an upper surface of the stator core and insulates the power terminal units from the stator core, and
protrusions that radially protrude from an inner circumferential surface of the upper insulator body and face the coils, each of the protrusions defining a guide hole that passes therethrough and receives one of the first ends of the coils, and
wherein the power terminal is disposed on an upper surface of one of the protrusions at a position corresponding to the guide hole and defines a space to accommodate the one of the first ends of the coils passing through the guide hole.

2. The motor of claim 1, wherein a cross sectional area of the guide hole decreases as one of the protrusions defining the guide hole extends upward from the upper insulator body.

3. The motor of claim 2, wherein the power terminal is disposed vertically above the guide hole and directly contacts the guide hole.

4. The motor of claim 2, wherein each of the power terminal units further comprises a connection terminal connected to the power terminal and to the one of the first ends of the coils, and
wherein the connection terminal is disposed on a top surface of the one of the protrusions.

5. The motor of claim 2, wherein each of the first ends of the coils is drawn out from one of the teeth, passes through the guide hole, and is connected to the power terminal.

6. The motor of claim 1, wherein the guide hole vertically extends through an inside of one of the protrusions defining the guide hole, and
wherein a cross sectional width of the guide hole decreases as the one of the protrusions extends upward from the upper insulator body.

7. The motor of claim 1, wherein the stator further comprises a lower insulator coupled to a bottom surface of the stator core,
wherein a second end of each of the coils is downwardly drawn out of the one of the teeth and connected to one of neutral-point lead wires, and
wherein the lower insulator comprises:
neutral terminal units, each of the neutral terminal units being connected to one of the second ends of the coils; and
a lower insulator body that insulates the neutral terminal units from the stator core.

8. The motor of claim 7, wherein the neutral terminal units comprise:
neutral terminals, each of the neutral terminals protruding in a radial direction of the back yoke and being connected to one of the second ends of the coils; and
a neutral connecting member that connects the neutral terminals to each other.

9. The motor of claim 8, wherein the neutral connecting member defines a portion of an inner surface of the lower insulator.

10. The motor of claim 8, wherein the neutral terminals have a same vertical level.

11. The motor of claim 8, wherein each of the neutral-point lead wires is connected to one of the neutral terminals and disposed inside the lower insulator.

12. The motor of claim 1, wherein the guide hole defines a closed shape surrounded by one of the protrusions.

13. The motor of claim 1, wherein a width of the guide hole is greater than a width of the space defined in the power terminal.

14. A motor comprising:
a stator; and
a rotor configured to rotate relative to the stator,
wherein the stator comprises:
a stator core having an inner circumferential surface that defines a back yoke of the motor, the stator core defining grooves that extend along the inner circumferential surface,
teeth, each of the teeth comprising a coupling portion that is received in one of the grooves and a wound portion that extends radially inward of the back yoke from the coupling portion,
coils, each of the coils being wound around one of the teeth, wherein each of the coils has a first end that is upwardly drawn out of the one of the teeth and configured to provide power to the stator and a second end that is downwardly drawn out of the one of the teeth,
an upper insulator disposed at an upper side of the stator core, and
a lower insulator coupled to a bottom surface of the stator core,
wherein the upper insulator comprises:
power terminal units including a power terminal connected to one of the first ends of the coils, and
an upper insulator body that is coupled to an upper surface of the stator core and insulates the power terminal units from the stator core,
protrusions that radially protrude from an inner circumferential surface of the upper insulator body and face the coils, each of the protrusions defining a guide hole that passes therethrough and receives one of the first ends of the coils,
wherein the lower insulator comprises:
neutral terminal units, each of the neutral terminal units being connected to one of the second ends of the coils, and
a lower insulator body that insulates the neutral terminal units from the stator core, and
wherein the power terminal is disposed on an upper surface of one of the protrusions at a position corresponding to the guide hole and defines a space to accommodate the one of the first ends of the coils passing through the guide hole.

15. The motor of claim 14, wherein the power terminal is disposed radially inward of the back yoke, and
wherein each of the neutral terminal units comprises a neutral terminal connected to one of the second ends of the coils and disposed radially inward of the back yoke.

16. The motor of claim 15, wherein the power terminal is disposed vertically above the guide hole and directly contacts the guide hole.

17. The motor of claim 15, wherein the neutral terminal units comprise:
neutral terminals, each of the neutral terminals protruding radially inward of the back yoke; and
a neutral connecting member that connects the neutral terminals to each other.

18. The motor of claim 17, wherein each of the neutral terminal units is inserted into the lower insulator body to thereby define a part of the lower insulator.

19. The motor of claim 18, wherein the neutral terminals have a same vertical level.

20. The motor of claim 14, wherein each of the first ends of the coils extends upward of one of the teeth, and wherein each of the second ends of the coils extends downward of one of the teeth.

\* \* \* \* \*